United States Patent
Zeng et al.

(10) Patent No.: US 9,152,786 B2
(45) Date of Patent: Oct. 6, 2015

(54) METHOD AND DEVICE FOR CONTROLLING INVOCATION OF AN APPLICATION PROGRAMMING INTERFACE

(71) Applicant: Tencent Technology (Shenzhen) Company Limited, Shenzhen (CN)

(72) Inventors: Xing Zeng, Shenzhen (CN); Jiahui Liang, Shenzhen (CN); Danhua Li, Shenzhen (CN); Wenliang Tang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 83 days.

(21) Appl. No.: 14/079,589

(22) Filed: Nov. 13, 2013

(65) Prior Publication Data
US 2014/0075546 A1   Mar. 13, 2014

Related U.S. Application Data

(63) Continuation of application No. PCT/CN2013/081516, filed on Aug. 15, 2013.

(51) Int. Cl.
 G06F 17/30   (2006.01)
 G06F 21/52   (2013.01)
 G06F 9/445   (2006.01)

(52) U.S. Cl.
 CPC ............ *G06F 21/52* (2013.01); *G06F 9/44526* (2013.01)

(58) Field of Classification Search
 CPC ......... G06F 21/50; G06F 21/44; G06F 21/51; G06F 21/64; G06F 21/6281; G06F 21/629; G06F 21/54; G06F 21/563; G06F 21/565; G06F 21/566
 USPC .............................. 726/16–301; 713/190, 193
 See application file for complete search history.

(56) References Cited

U.S. PATENT DOCUMENTS 6,101,607 A     8/2000  Bachand et al.
7,421,577 B2 *  9/2008  Ichikawa et al. ............. 713/156
(Continued)

FOREIGN PATENT DOCUMENTS

CN   101359352 A   2/2009
CN   101587439 A   11/2009
(Continued)

OTHER PUBLICATIONS

Tencent Technology, ISRWO, PCT/CN2013/081516, Nov. 21, 2013, 11 pgs.

*Primary Examiner* — Hosuk Song
(74) *Attorney, Agent, or Firm* — Morgan, Lewis & Bockius LLP

(57) ABSTRACT

A computer-implemented method for controlling invocation of application programming interface (API) is provided. The method includes categorizing a plurality of APIs according to a plurality of API categories. The API categories are categorized by an API function through which user information is obtained. The method further includes setting a default invoking permission for a respective API category, and detecting, in real time, an attempt by an application to invoke an API in the respective API category. Upon detecting the attempted invocation of the API in the API category by the application, the method further includes controlling the invoking behavior of the API by the application in accordance with the default invoking permission for the API category.

18 Claims, 12 Drawing Sheets

(56) References Cited

U.S. PATENT DOCUMENTS

| | | | |
|---|---|---|---|
| 7,437,440 B2 * | 10/2008 | Manion et al. | 709/223 |
| 8,677,501 B2 * | 3/2014 | Fujishima et al. | 726/26 |
| 8,719,848 B2 * | 5/2014 | Kaneko et al. | 719/328 |
| 2004/0237064 A1 * | 11/2004 | Liu et al. | 717/101 |

FOREIGN PATENT DOCUMENTS

| | | |
|---|---|---|
| CN | 101814084 A | 8/2010 |
| CN | 102413221 A | 4/2012 |
| EP | 2453378 A2 | 5/2012 |

\* cited by examiner

METHOD AND DEVICE FOR CONTROLLING INVOCATION OF AN APPLICATION PROGRAMMING INTERFACE

RELATED APPLICATIONS

This application is a continuation application of PCT Patent Application No. PCT/CN2013/081516, entitled "METHOD AND DEVICE FOR CONTROLLING INVOCATION OF AN APPLICATION PROGRAMMING INTERFACE" filed on Aug. 15, 2013, which claims priority to Chinese Patent Application No. 201210291597.0, entitled "METHOD AND DEVICE FOR CONTROLLING INVOCATION OF APPLICATION PROGRAMMING INTERFACE", filed on Aug. 16, 2012, both of which are incorporated by reference in their entirety.

TECHNICAL FIELD

The disclosed implementations relate generally to the field of computer technologies, and in particular, to a method and a device for controlling invocation of an application programming interface (API).

BACKGROUND

Applications developed for intelligent devices (e.g., smart phones, smart televisions, tablets, and the like) emerge one after another. Often, these applications are capable of obtaining user information (for example, contacts stored in an address book, a geographical location of the device as determined by a global positioning system (GPS), etc.) by invoking an API (sometimes called an "API call") provided by an operating system. However, it is not always apparent to users of such devices what sorts of information is being accessed and obtained. In some circumstances, malicious applications may also perform unwanted actions through APIs, for example, by thieving information of a contact person, surreptitiously reading the geographical location of the device, monitoring phone calls made by the user, or silently installing/uninstalling applications. Such actions violate the privacy of the user.

In conventional methods of controlling invocation of an API by an application, the user is informed of an invoking permission of an application when the application is installed. Specifically, an invoking permission list of the application is sometimes listed in an installation interface of the application, and the user is asked to agree to the terms of use of the application, including the listed invoking permissions. If the user agrees with the terms of use, the application is installed. If the user does not agree with terms of use, installation of the application is canceled.

Thus, there is no middle ground that allows the user to use the application but with limited permission to invoke certain APIs. Furthermore, it is difficult for the user to identify whether an invoking permission in an invoking permission list is necessary for an application, and most users neglect presentation of the invoking permission list when an application is installed and directly agree to install the application, which leads to the application maliciously obtaining user information. As a result, the security of the device is reduced, and the user experience is affected.

SUMMARY

To address the aforementioned problems, some implementations of the present invention provide a computer-implemented method for controlling invocation of an application programming interface (API). The method includes categorizing a plurality of APIs according to a plurality of API categories. The API categories are categorized by an API function through which user information is obtained. The method further includes: setting a default invoking permission for a respective API category, and detecting, in real time, an attempt by an application to invoke an API in the respective API category. Upon detecting the attempted invocation of the API in the API category by the application, the method further includes controlling the invoking behavior of the API by the application in accordance with the default invoking permission for the API category.

To address the aforementioned problems, some implementations of the present invention provide an electronic device. The electronic device includes one or more processors, memory, and one or more programs. The one or more programs are stored in memory and configured to be executed by the one or more processors. The one or more programs include an operating system and instructions that when executed by the one or more processors cause the electronic device to categorize a plurality of APIs according to a plurality of API categories. The API categories are categorized by an API function through which user information is obtained. The electronic device further sets a default invoking permission for a respective API category and detects, in real time, an attempt by an application to invoke an API in the respective API category. Upon detecting the attempted invocation of the API in the API category by the application, the electronic device controls the invoking behavior of the API by the application in accordance with the default invoking permission for the API category.

To address the aforementioned problems, some implementations of the present invention provide a non-transitory computer readable storage medium storing one or more programs. The one or more programs include instructions, which when executed by an electronic device with one or more processors and memory, cause the electronic device to categorize a plurality of APIs according to a plurality of API categories. The API categories are categorized by an API function through which user information is obtained. The electronic device further sets a default invoking permission for a respective API category and detects, in real time, an attempt by an application to invoke an API in the respective API category. Upon detecting the attempted invocation of the API in the API category by the application, the electronic device controls the invoking behavior of the API by the application in accordance with the default invoking permission for the API category.

BRIEF DESCRIPTION OF DRAWINGS

For a better understanding, reference should be made to the following detailed description taken in conjunction with the accompanying drawings, in which.

DETAILED DESCRIPTION

The present invention provides a method for controlling invocation of an API. The method controls the invocation of an API by an application running on a device. Specifically, rather than merely having a user of the device agree to allow the application to access information obtained using API when the application is installed, the implementations described herein provide a method and device that grants the user a more finely granular level of control over what sorts of information is being accessed by applications running on the device.

To that end, the methods and devices described herein categorize APIs according to their function (namely, according to the type of user information the APIs are capable of obtaining). For example, a set of one or more APIs may be categorized as "Location Data" APIs if they are capable of interacting with, e.g., a global position system of the device to return data pertaining to the location of the device. The methods and devices described herein provide a manner with which the user can set a default permission for each API categories such that, for example, applications are allowed to invoke APIs within the API category, or are prohibited from invoking APIs within the API category. In some circumstances, the user may also configure the device to ask the user for further instructions each time an API in the API category is invoked.

Reference will now be made in detail to various implementations, examples of which are illustrated in the accompanying drawings. In the following detailed description, numerous specific details are set forth in order to provide a thorough understanding of the present disclosure and the described implementations herein. However, implementations described herein may be practiced without these specific details. In other instances, well-known methods, procedures, components, and mechanical apparatus have not been described in detail so as not to unnecessarily obscure aspects of the implementations.

Figure 1:
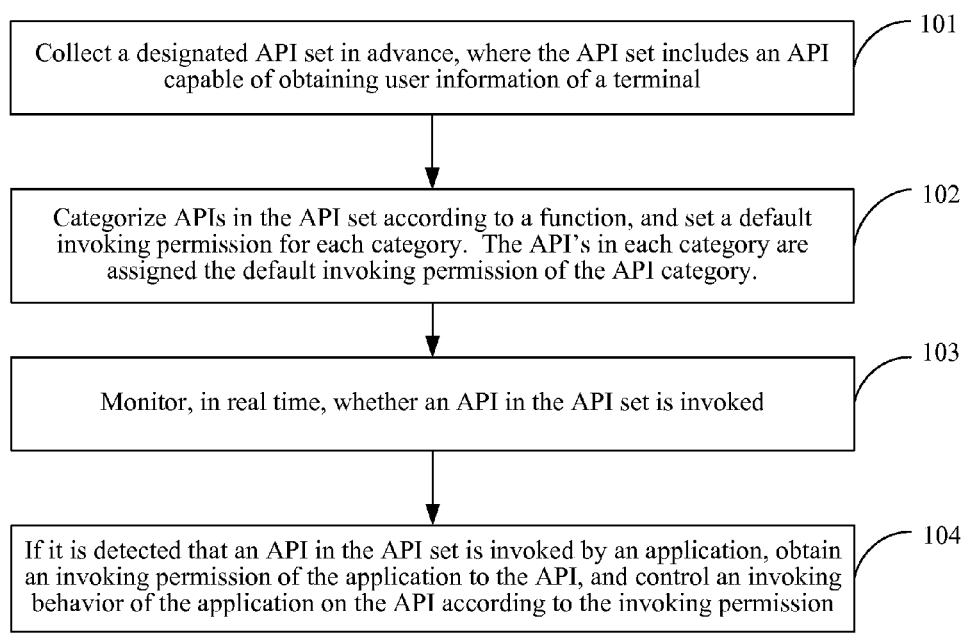
FIG. 1 is a flowchart of a method for controlling invocation of an API, in accordance with some implementations.
Figure 3:
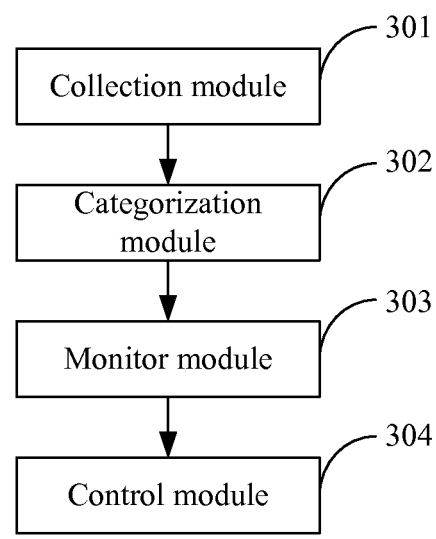
FIG. 3 is a schematic structural diagram of a device for controlling invocation of an API, in accordance with some implementations.

Referring to FIG. 1, some implementations provide a method 100 for controlling invocation of an API. In some embodiments, the method 200 is implemented in one or more software modules of an electronic device 300 (FIG. 3). The method 100 is as follows:

101: Collect a designated API set in advance. The API set includes an API capable of obtaining user information from a device.

102: Categorize APIs in the API set according to a function, and set a default invoking permission for each category. The APIs in each category are assigned the default invoking permission of the API category.

103: Monitor, in real time, whether an API in the API set is invoked.

104: If it is detected that an API in the API set is invoked by an application, obtain an invoking permission of the application to the API, and control an invoking behavior of the application on the API according to the invoking permission.

Furthermore, controlling the invoking behavior of the application on the API according to the invoking permission includes:

if the invoking permission is an access permission, permitting the application to invoke the API;

if the invoking permission is a prohibition permission, prohibiting the application from invoking the API; or if the invoking permission is prompt permission, prompting a user to set a current invoking permission, and if the user sets the current invoking permission to the access permission, permitting the application to invoke the API this time, or if the user sets the current invoking permission to the prohibition permission, prohibiting the application from invoking the API this time.

Furthermore, in some implementations, after the prompting the user to set the current invoking permission, the method 100 further includes:

if a result set by the user is not received in preset time, prohibiting the application from invoking the API this time.

Furthermore, in some implementations, after prompting the user to set the current invoking permission, the method 100 further includes:

if the user sets it to remember a current selection result, when it is detected again that the API is invoked by the application, controlling the invoking behavior of the application on the API according to the current selection result of the user.

Furthermore, in some implementations, after the setting the default invoking permission for each category, the method 100 further includes:

when a request of the user for setting an invoking permission for an API category capable of being invoked by the application is received, prompting the user to select an invoking permission from an access permission, a prohibition permission, and a prompt permission, and setting an invoking permission of the application to the API category according to a selection result of the user.

Furthermore, in some implementations, when the request of the user for setting the invoking permission for an API category capable of being invoked by the application is received, the method 100 further includes: prompting the user to select an invoking permission from the group consisting of: the access permission, the prohibition permission. In some implementations, the prompt permission further includes:

when the user starts an invoking permission setting function, displaying each API category, receiving an API category selected by the user, displaying all applications capable of invoking the API category, receiving an application selected by the user, and prompting the user to select an invoking permission from the group consisting of: the access permission, the prohibition permission, and the prompt permission, or when the user starts an invoking permission setting function, displaying each application, receiving an application selected by the user, displaying all API categories capable of being invoked by the application, receiving an API category selected by the user, and prompting the user to select an invoking permission from the group consisting of: the access permission, the prohibition permission, and the prompt permission.

According to the method 100, a designated API set is collected. APIs in the API set are categorized according to a function, and a default invoking permission is set for each category. Invocation of an API in the API set is monitored in real time; and if it is detected that an API in the API set is invoked by an application, an invoking permission of the application to the API is obtained, and an invoking behavior of the application on the API is controlled according to the invoking permission, so as to (1) avoid the problem of the application maliciously obtaining user information, (2) improve the security of a device, and further (3) improve user experience.

By setting the invoking permission to prompt every time, the user is prompted to set a current invoking permission, and the invoking permission can be set according to a current invoking behavior, so as to improve the flexibility of setting the invoking permission; and in addition, if a result set by the user is not received in preset time, the application is prohibited from invoking the API, so as to reduce the operating complexity of setting the invoking permission and further improve the user experience.

Figure 2:
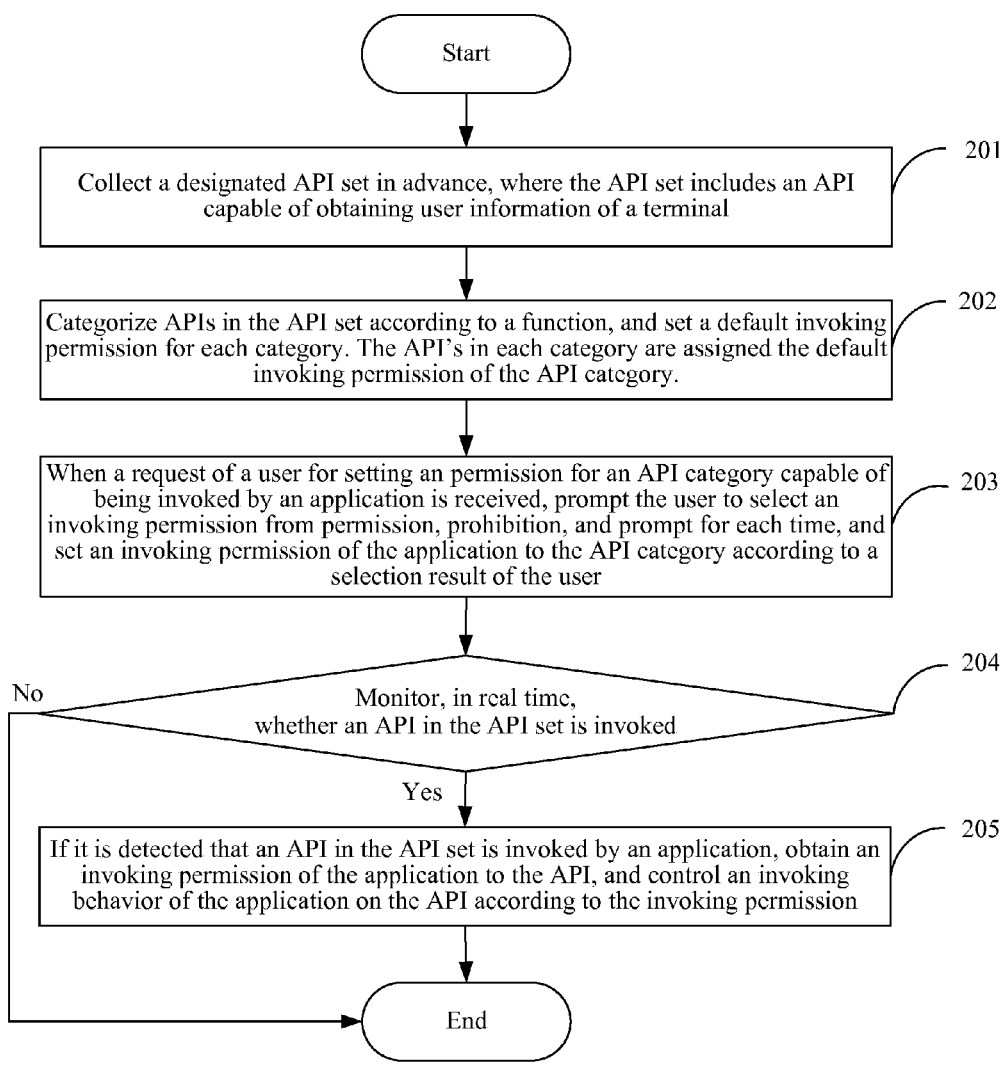
FIG. 2 is a flowchart of a method for controlling invocation of an API, in accordance with some implementations.

Referring to FIG. 2, some implementation provides a method 200 for controlling invocation of an API. In some embodiments, the method 200 is implemented in one or more software modules of an electronic device 300 (FIG. 3). The method 200 is as follows:

201: Collect a designated API set in advance, where the API set includes an API capable of obtaining user information of a device.

In some circumstances, the user information is private information about the user, and may include call records, a text messages and metadata, user contacts, and the geographical location of the device. An application of the device may obtain the user information through an API. In some circumstances, the API is a predefined interface function, and the application obtains the user information by invoking the interface function. Generally, an API is an interface for obtaining one kind of user information, for example, a call record API is an interface for obtaining a call record, a geographical location API is an interface for obtaining the geographical location of the device, and so on.

In this implementation, user information that needs to be protected may be designated in advance, and the device searches for APIs according to the one or more kinds of designated user information, and combines the resultant APIs into an API set.

202: Categorize APIs in the API set according to a function, and set a default invoking permission for each category. The APIs in each category are assigned the default invoking permission of the API category.

In some implementations, an application can obtain the user information by invoking an API. Some APIs, however are not necessary for use of the application. For example, an application that provides a user with restaurant reviews may have features that access location information from the device, e.g., in order to obtain listing of nearby restaurants. However, the application need not have the location information to operate. For example, in another mode of operation, the application could locate restaurants near a user specified location (e.g., a manually specified location). In order to prevent an application from invoking these unnecessary APIs to obtain the user information which causes leakage of the user information, an invoking permission may be set for an API. For example, by limiting the invoking permissions of the restaurant review application, the user can continue to use the restaurant review application while preventing it from obtaining location data from the device.

In some implementations, the function refers to a function implemented by an API, which also correspondingly reflects a function of an application invoking the API. For example, the API set includes a call record API, a contact person API, a recording API, a device identification code API, and a device model API. When the APIs are categorized, the call record API and the contact person API may be combined into a call API category, the recording API can be combined into a recording API category, the device identification code API and the device model API can be combined into a system API category, and so on.

Furthermore, in some implementations, when the default invoking permission is set for each API category, it may be set according to a function of the API category. For example, an application providing a call function has access permission to the call API category by default, or an application providing a voice function has access permission to the recording API category by default, and so on.

203: When a request of the user for setting the invoking permission for an API category capable of being invoked by the application is received, prompt the user to select an invoking permission from the group consisting of: the access permission, the prohibition permission, and the prompt permission, and set an invoking permission of the application to the API category according to a selection result of the user.

The user may set the invoking permission for invoking the API category by the application, so that when the application invokes the API category, the device controls the invoking behavior to be more close to a habit of the user, thereby improving user experience.

Furthermore, before the invoking permission for invoking the API category by the application is set, the device may display the application and the API category on a user interface, so that the user can perform a setting behavior. Some implementation provide two methods for displaying the application and the API category, which are: displaying each API category on the interface, and displaying, under each API category, all applications capable of invoking the API category, or displaying each application on the interface, and displaying, under each application, all API categories capable of being invoked by the application.

According to the two display methods provided above, when a request of a user for setting an invoking permission for an API category capable of being invoked by an application is received, prompting the user to select an invoking permission from the group consisting of: the access permission, the prohibition permission, and the prompt permission includes:

when the user starts an invoking permission setting function, displaying each API category, receiving an API category selected by the user, displaying all applications capable of invoking the API category, receiving an application selected by the user, and prompting the user to select an invoking permission from the group consisting of: the access permission, the prohibition permission, and the prompt permission, or when the user starts an invoking permission setting function, displaying each application, receiving an application selected by the user, displaying all API categories capable of being invoked by the application, receiving an API category selected by the user, and prompting the user to select an invoking permission from the group consisting of: the access permission, the prohibition permission, and the prompt permission.

204: Monitor, in real time, whether an API in the API set is invoked, and if yes, perform 205; otherwise, end the procedure.

Specifically, the device may add a monitor process (e.g., running in the background of the device) to monitor whether an API in the API set is invoked.

205: If it is detected that an API in the API set is invoked by an application, obtain an invoking permission of the application to the API, and control an invoking behavior of the application on the API according to the invoking permission, and end the procedure.

In some implementations, if it is detected that the application invokes the API, an invoking permission of the application to an API category to which the API belongs is obtained, so as to obtain the invoking permission of the application to the API, and the invoking behavior of the application on the API is controlled according to the invoking permission.

In some implementations, controlling an invoking behavior of the application on the API according to the invoking permission includes:

if the invoking permission is the access permission, permitting the application to invoke the API;

if the invoking permission is the prohibition permission, prohibiting the application from invoking the API; or if the invoking permission is the prompt permission, prompting a user to set a current invoking permission, and if the user sets the current invoking permission to the access permission, permitting the application to invoke the API this time, or if the user sets the current invoking permission to the prohibition permission, prohibiting the application from invoking the API this time.

Furthermore, in some implementations, after the prompting a user to set a current invoking permission, the method 200 further includes:

if a result set by the user is not received in preset time, prohibiting the application from invoking the API this time.

In some implementations, preset time is set voluntarily, for example, the preset time may be set to 10 s, or the preset time is changed to 15 s, and so on.

In this implementation, the method further includes: after the prompting a user to set a current invoking permission, if the user sets it to remember a current selection result, when it is detected again that the API is invoked by the application, controlling the invoking behavior of the application on the API according to the selection result of the user.

If the user sets it to remember the current selection result, the selection result of the user is always valid until the user changes the invoking permission to the API category to which the API belongs; or if the user does not set it to remember the current selection result, the current selection result is only aimed at the current invoking behavior, and when the API is invoked next time, the user is still prompted to set an invoking permission.

In some implementations, if the user sets the current invoking permission to the access permission and configures the device 300 to remember the selection, the application is permitted to invoke the API, if the user sets the current invoking permission to the prohibition permission and remember the selection, the application is prohibited from invoking the API, or if the result set by the user is not received in the preset time and the setting of remembering the selection is received, the application is prohibited from invoking the API.

According to the method 200, a designated API set is collected in advance; APIs in the API set are categorized according to a function, and a default invoking permission is set for each category; whether an API in the API set is invoked is monitored in real time; and if it is detected that an API in the API set is invoked by an application, an invoking permission of the application to the API is obtained, and an invoking behavior of the application on the API is controlled according to the invoking permission, so as to (1) avoid applications maliciously obtaining user information, (2) improve the security of a device, and further (3) improve user experience.

By setting the invoking permission to prompt every time, a user is prompted to set a current invoking permission, and an invoking permission can be set according to a current invoking behavior, so as to improve the flexibility of setting the invoking permission; and in addition, if a result set by the user is not received in preset time, the application is prohibited from invoking the API, so as to reduce the operating complexity of setting the invoking permission and further improve the user experience.

Referring to FIG. 3, some implementations provides a device 300 for controlling the invoking of an API. The device 300 includes:

a collection module 301, configured to collect a designated API set in advance, where the API set includes an API capable of obtaining user information of a device; the collection module 301 in some implementations performs the method 100 of FIG. 1.

a categorizing module 302, configured to categorize APIs in the API set according to a function, and set a default invoking permission for each category. The APIs in each category are assigned the default invoking permission of the API category.

a monitor module 303, configured to monitor, in real time, whether an API in the API set is invoked; and a control module 304, configured to: if it is detected that an API in the API set is invoked by an application, obtain an invoking permission of the application to the API, and control an invoking behavior of the application on the API according to the invoking permission.

Figure 4:
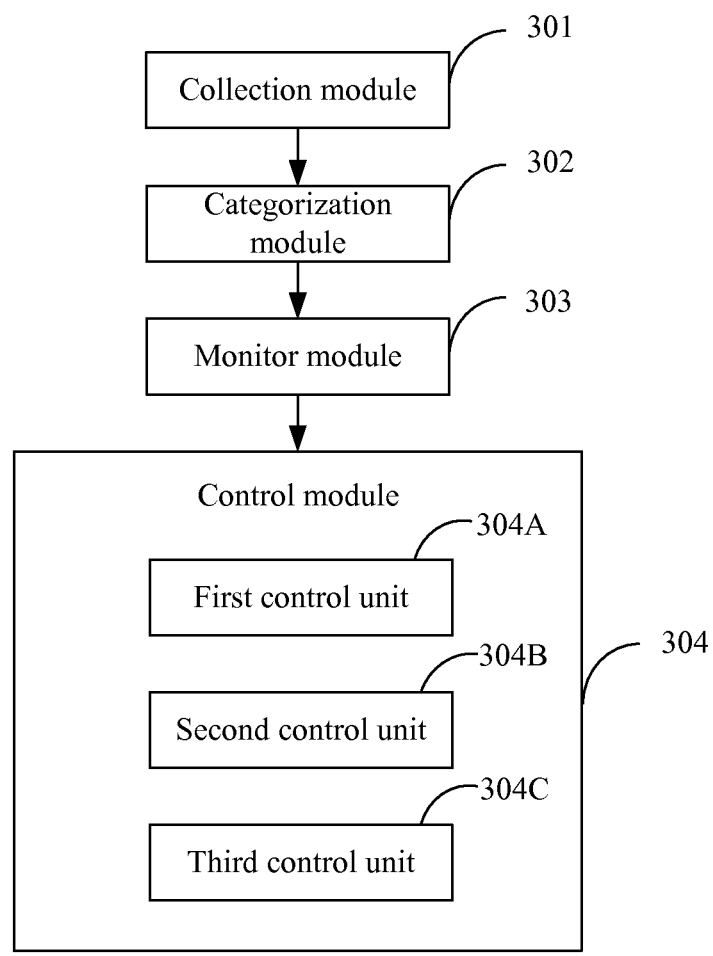
FIG. 4 is a schematic structural diagram of a device for controlling invocation of an API, in accordance with some implementations.

Referring to FIG. 4, in some implementation, the control module 304 includes:

a first control unit 304A, configured to: if the invoking permission is the access permission, permit the application to invoke the API;

a second control unit 304B, configured to: if the invoking permission is the prohibition permission, prohibit the application from invoking the API; and a third control unit 304C, configured to: if the invoking permission is prompt every time, prompt a user to set a current invoking permission, and if the user sets the current invoking permission to the access permission, permit the application to invoke the API this time, or if the user sets the current invoking permission to prohibition, prohibit the application from invoking the API this time.

In this implementation, the third control unit 304C is further configured to: after prompting the user to set the current invoking permission, if a result set by the user is not received in preset time, prohibit the application from invoking the API this time.

In this implementation, the third control unit 304C is further configured to: if the user sets it to remember a current selection result, when it is detected that the API is invoked by the application again, control the invoking behavior of the application on the API according to the selection result of the user.

In this implementation, the device further includes:

a setting module, configured to: after the categorizing module 302 sets the default invoking permission for each category, when a request of a user for setting an invoking permission for an API category capable of being invoked by an application is received, prompt the user to select an invoking permission from the group consisting of: the access permission, the prohibition permission, and the prompt permission, and set an invoking permission of the application to the API category according to a selection result of the user.

In this implementation, the setting module is configured to: when the user starts an invoking permission setting function, display each API category, receive an API category selected by the user, display all applications capable of invoking the API category, receive an application selected by the user, and prompt the user to select an invoking permission from the group consisting of: the access permission, the prohibition permission, and the prompt permission, or when the user starts an invoking permission setting function, display each application, receive an application selected by the user, display all API categories capable of being invoked by the application, receive an API category selected by the user, and prompt the user to select an invoking permission from the group consisting of: the access permission, the prohibition permission, and the prompt permission.

The foregoing device for controlling invoking of an API that is provided in this implementation can perform the method for controlling invoking of an API according to any one of the foregoing method implementations, and for a specific procedure, reference is made to the descriptions in the method implementations, which is not elaborated herein again.

According to the device for controlling invoking of an API that is provided in this implementation, a designated API set is collected in advance; APIs in the API set are categorized according to a function, and a default invoking permission is set for each category; whether an API in the API set is invoked is monitored in real time; and if it is detected that an API in the API set is invoked by an application, an invoking permission of the application to the API is obtained, and an invoking behavior of the application on the API is controlled according to the invoking permission, so as to avoid a problem that an application maliciously obtains user information, improve the security of a device, and further improve user experience.

By setting the invoking permission to the prompt permission, a user is prompted to set a current invoking permission, and an invoking permission can be set according to a current invoking behavior, so as to improve the flexibility of setting the invoking permission; and in addition, if a result set by the user is not received in preset time, the application is prohibited from invoking the API, so as to reduce the operating complexity of setting the invoking permission and further improve the user experience.

It should be noted that, when the device for controlling invoking of an API that is provided by the foregoing implementation exists, only division of the foregoing functional modules is taken as an example for illustration, and in an actual application, the foregoing functions may be accomplished by different functional modules as required, that is, the internal structure of the device is divided into different functional modules, so as to accomplish all or a part of the functions in the foregoing description. In addition, the device for controlling invoking of an API that is provided by the foregoing implementation belongs to the same concept as the implementation of the method for controlling invoking of an API, and for a specific implementation process, reference is made to the method implementation, which is not elaborated herein again.

FIGS. 5A-5D illustrate examples of user interfaces for controlling the invocation of APIs, in accordance with some implementations. For ease of explanation, FIGS. 5A-5D are described with reference to a device 500.

Figure 5A:
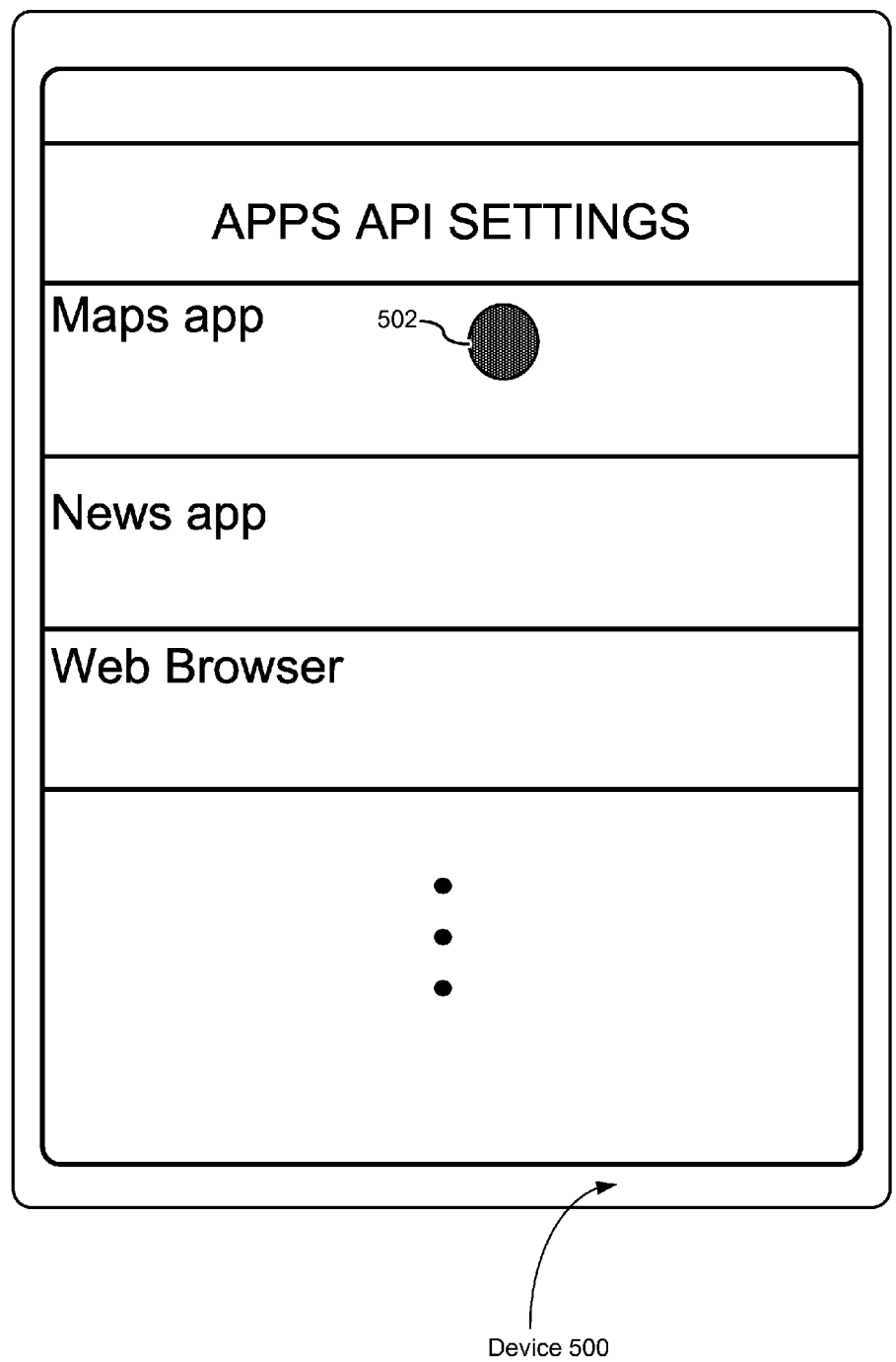
FIGS. 5A-5D illustrate user interfaces for controlling invocation of an API, in accordance with some implementations.
Figure 5B:
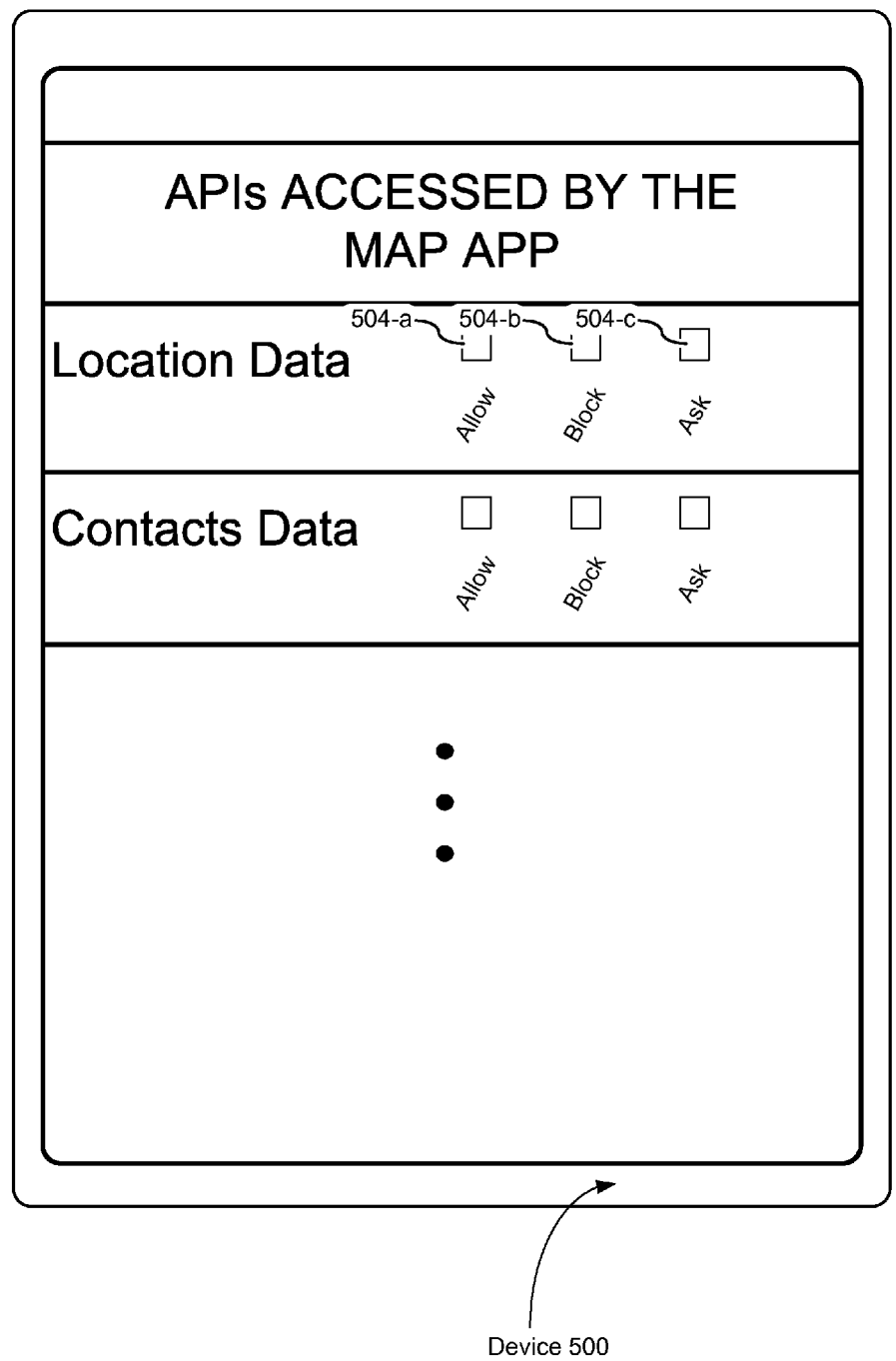

FIGS. 5A and 5B illustrate user interfaces, in accordance with some implementations, that implement the operations 604, 606, and 608, as will be described with reference to FIG. 6A.

FIG. 5A illustrates a user interface that displays a listing of applications (e.g., a maps application, a news application and a web browser applications, sometimes referred to as "apps"), in accordance with some implementations. In some implementations, as shown in FIG. 5A, the listing of applications is part of a user interface for controlling API settings, specifically controlling the invocation of APIs. FIG. 5A also illustrates a user input 502 (e.g., a touch input on a touch sensitive surface, or a mouse click using an external input device such as a mouse).

FIG. 5B illustrates a user interface that displays a listing of API categories, in accordance with some implementations. Namely, the user interface illustrated in FIG. 5B is displayed in response to the user input 502 and the API categories that are displayed (in this example) are those API categories that the maps application is capable of invoking. In this example, API categories for the maps application are shown because it was selected by user input 502 in FIG. 5A.

Figure 5C:
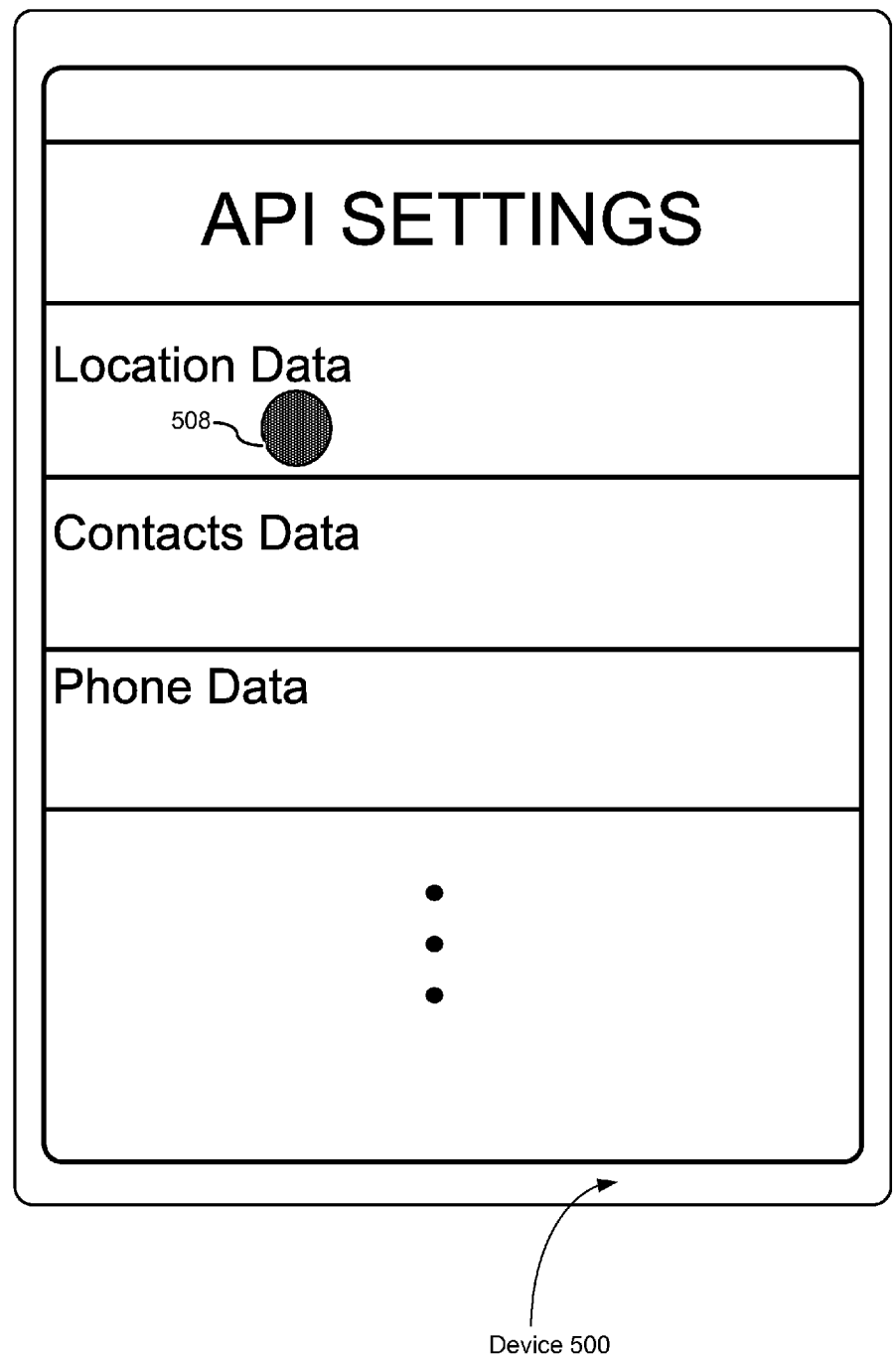
Figure 5D:
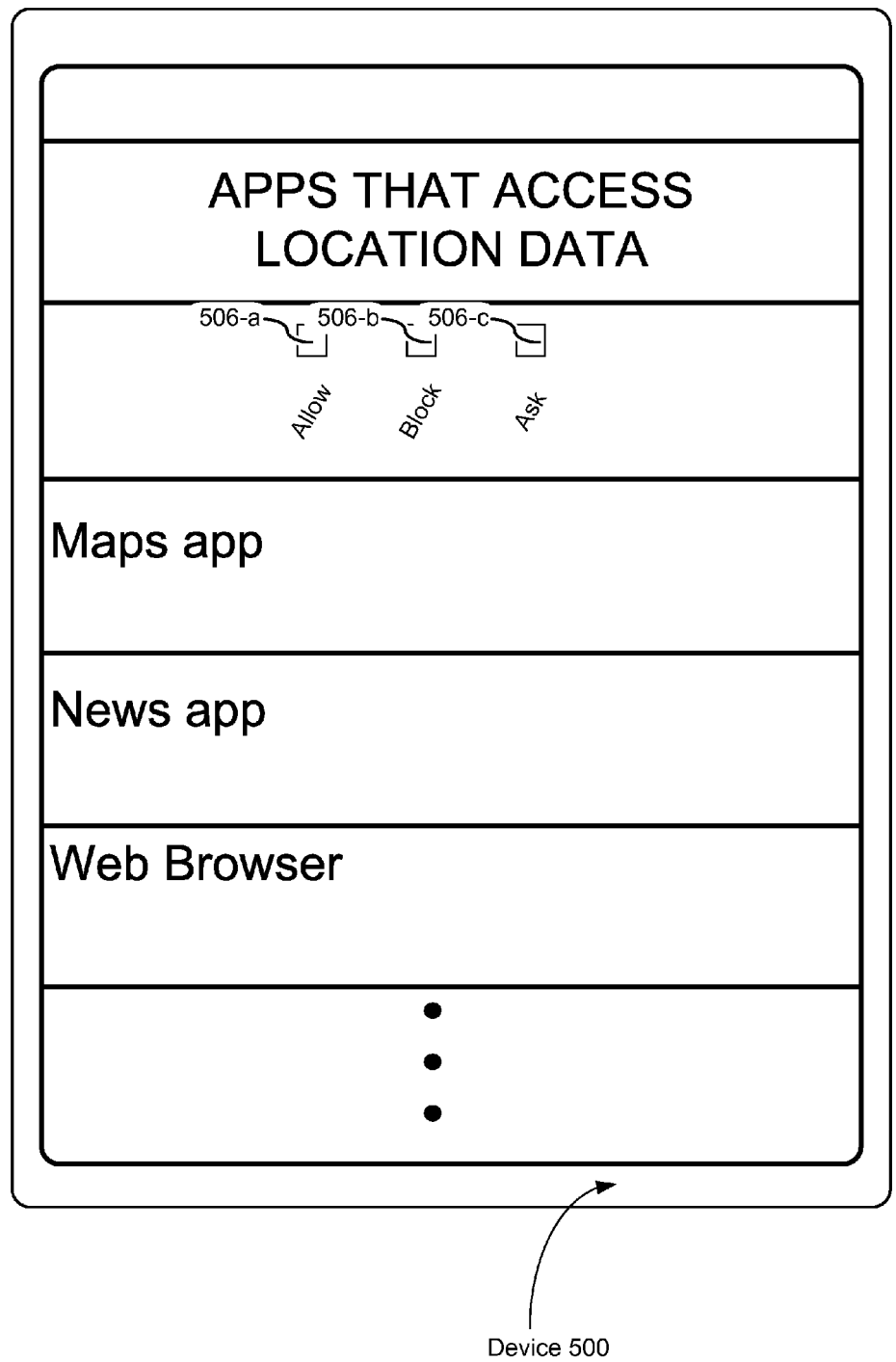

FIGS. 5C and 5D illustrate user interfaces, in accordance with some implementations, that implement the operations 610, 612, and 616, as will be described with reference to FIG. 6A.

FIG. 5C illustrates a user interface that displays a listing of API categories (e.g., a Location Data API category, a Contacts Data API category, and Phone Data API category). In some implementations, as shown in FIG. 5C, the listing of applications is part of a user interface for controlling API settings, specifically controlling the invocation of APIs. FIG. 5C also illustrates a user input 508 (e.g., a touch input on a touch sensitive surface or a mouse click using an external input device such as a mouse).

FIG. 5D illustrates a user interface that displays a listing of applications. Namely, the user interface illustrated in FIG. 5C is displayed in response to the user input 508 and the applications that are displayed (in this example) are those applications which are capable of invoking at least one API in the Location Data API category (since the Location Data API category was selected by user input 506, FIG. 5C).

Figure 6A:
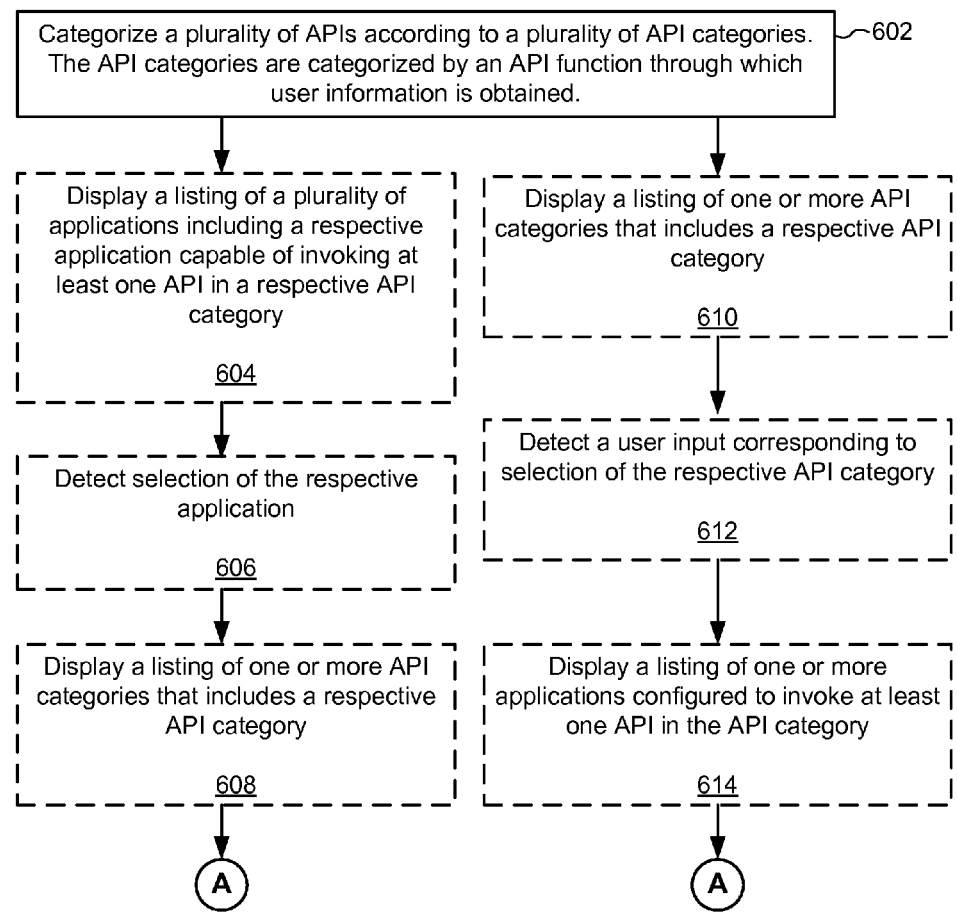
FIGS. 6A-6C is a schematic flowchart of a method for controlling invocation of an API, in accordance with some implementations.
Figure 6B:
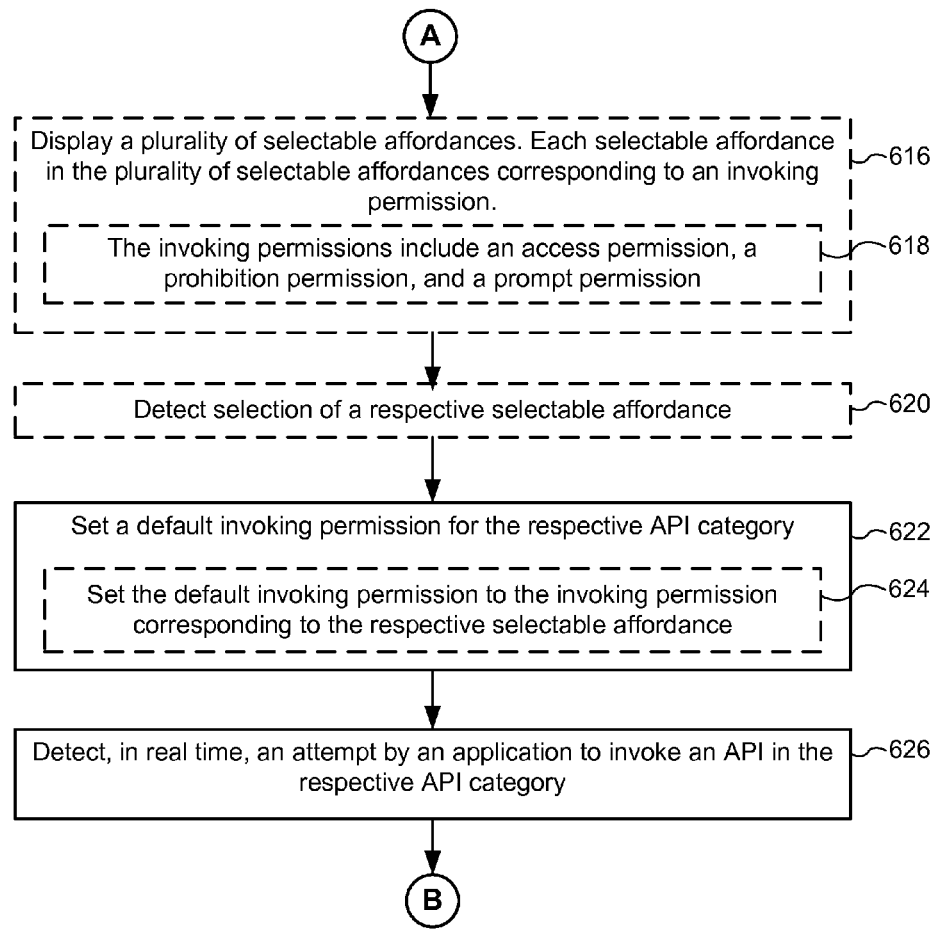
Figure 6C:
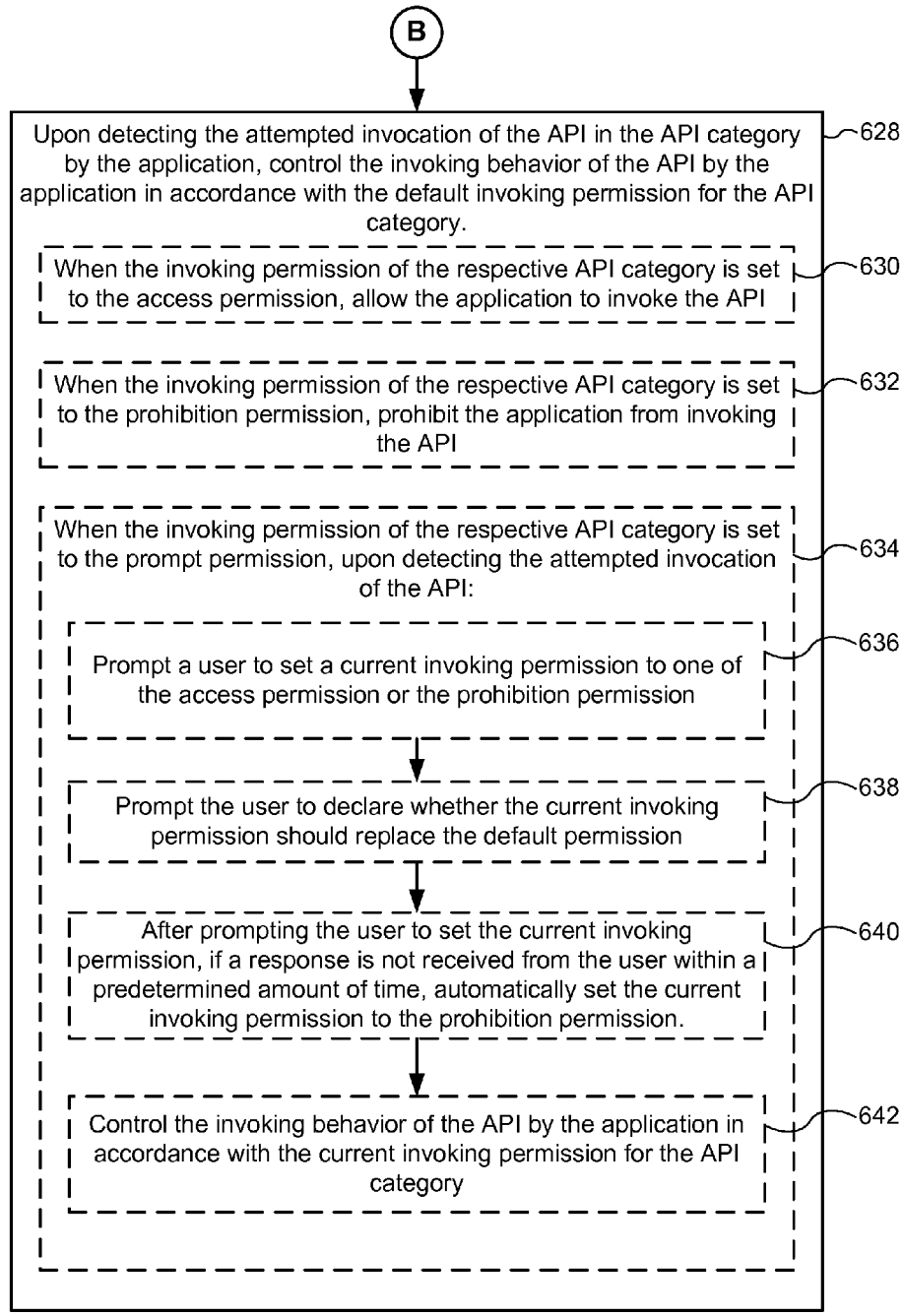

FIGS. 6A-6C is a schematic flowchart of a method 600 for controlling invocation of Application Programming Interface (API), in accordance with some implementations. In some implementations, the method 600 is performed at a device (e.g., device 500, FIG. 5) that includes an operating system that provides APIs through which application may obtain data. In some implementations, method 600 provides a manner in which to set an invoking permission for a respective API category. For ease of explanation, the method 600 will be described herein by means of examples with reference to a "Location Data" API category as the respective API category.

The device categorizes (602) a plurality of APIs according to a plurality of API categories. The API categories are categorized by an API function through which user information is obtained. For example, the Location Data API category may include APIs that return a set of GPS coordinates of the device or embed an interactive map within an application of the device.

Operations 604, 606, and 608 represent an first path to reach operation 616, as described below. In some implementations, the device displays (604) a listing of a plurality of applications including a respective application capable of invoking at least one API in a respective API category. For example, FIG. 5A illustrates a listing of a plurality of apps (e.g., a maps app, a news app, and a web app). The maps app is capable of invoking location data using an API. The device then detects (606) selection of the respective application (e.g., the touch input 502). In some implementations, in response to detecting the selection of the respective application, the device displays (608) a listing of one or more API categories that includes the respective API category (e.g., as shown in FIG. 5B). In some implementations, the one or more API categories are (610) those API categories that include at least one API that the respective application is capable of invoking. As shown in FIG. 6B, the device displays (616) a plurality of selectable affordances (e.g., selectable affordances 504, FIG.

5B). Each selectable affordance in the plurality of selectable affordances corresponding to an invoking permission. In some implementations, the invoking permissions include (618) an access permission, a prohibition permission, and a prompt permission. For example, selectable affordance 504-a corresponds to an access permission (also called an allow permission).

Operations 610, 612, and 614 represent a second path to reach operation 616, as described below. Although the first and second paths are described as being separate, in some circumstances, various elements or aspects of the first path may be used in the second path and visa versa.

In some implementations, the device displays (610) a listing of one or more API categories that includes a respective API category. For example, FIG. 5C illustrates a listing of one or more API categories that include the Location Data API category. The device detects (612) a user input corresponding to selection of the respective API category. In some implementations, in response to detecting the user input corresponding to selection of the respective API category, the device displays a listing of one or more applications configured to invoke at least one API in the API category. For example, FIG. 5D illustrates a listing of one or more applications configured to invoke at least one API in the Location Data API category (e.g., an API that returns a set of GPS coordinates for the device). The device displays (616) a plurality of selectable affordances (e.g., selectable affordances 506, FIG. 5D). Each selectable affordance in the plurality of selectable affordances corresponding to an invoking permission. In some implementations, the invoking permissions include (618) an access permission, a prohibition permission, and a prompt permission. For example, selectable affordance 506-a corresponds to an access permission (also called an allow permission).

In some implementations, the device detects (620) selection of a respective selectable affordance. The device then sets (622) a default invoking permission for the respective API category. In some implementations, the device sets (624) the default invoking permission to the invoking permission corresponding to the respective selectable affordance.

The device detects (626), in real time, an attempt by an application to invoke an API in the respective API category. Upon detecting the attempted invocation of the API in the API category by the application, as shown in FIG. 6C, the device controls (628) the invoking behavior of the API by the application in accordance with the default invoking permission for the API category. Specifically, in some implementations, when the invoking permission of the respective API category is set to the access permission, the device allows (630) the application to invoke the API. When the invoking permission of the respective API category is set to the prohibition permission, the device prohibits (632) the application from invoking the API. When the invoking permission of the respective API category is set to the prompt permission, upon detecting (634) the attempted invocation of the API, the device prompts (636) a user to set a current invoking permission to one of the access permission or the prohibition permission. In some implementations, the device also prompts (648) the user to declare whether the current invoking permission should replace the default permission (e.g., the device asks the user if it should "remember" the choice). In some implementations, after prompting the user to set the current invoking permission, if a response is not received from the user within a predetermined amount of time, the device automatically (e.g., without user intervention) sets (640) the current invoking permission to the prohibition permission. In any event, the device controls (642) the invoking behavior of the API by the application in accordance with the current invoking permission for the API category.

Figure 7:
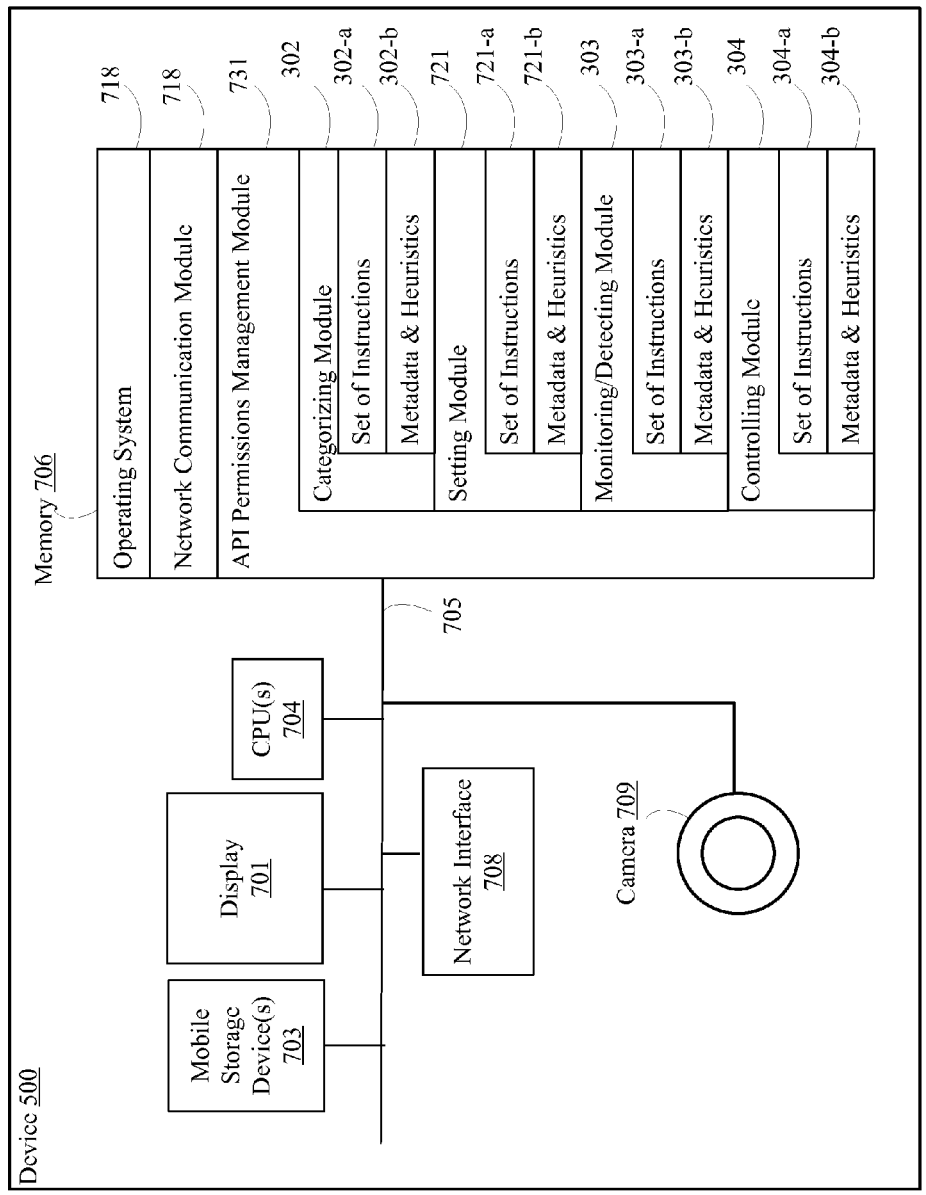
FIG. 7 is a structural schematic diagram of an electronic device for controlling invocation of an API, in accordance with some implementations.

FIG. 7 is a diagram of an example implementation of the device 500 (e.g., a laptop, tablet, smart phone, etc. such as the device 500 shown in FIG. 5) for controlling invocation of an API, in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the device 500 includes one or more processing units (CPU's) 704, one or more network or other communications interfaces 708, a display 701, memory 706, a digital camera 709, one or more mobile storage devices 703, and one or more communication buses 705 for interconnecting these and various other components. The communication buses 705 may include circuitry (sometimes called a chipset) that interconnects and controls communications between system components. Memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 706 may optionally include one or more storage devices remotely located from the CPU(s) 704. Memory 706, including the non-volatile and volatile memory device(s) within memory 706, comprises a non-transitory computer readable storage medium.

In some implementations, memory 706 or the non-transitory computer readable storage medium of memory 706 stores the following programs, modules and data structures, or a subset thereof including an operating system 716, a network communication module 718, and an API permission management module 731.

The operating system 716 includes procedures for handling various basic system services and for performing hardware dependent tasks. In some implementations, a set of APIs is also provided with the operating system. The APIs can be used to access information from the device 500, including, in some circumstances, user information such as information about a user's contacts, location information, call record information, etc.

The network communication module 718 facilitates communication with other devices via the one or more communication network interfaces 708 (wired or wireless) and one or more communication networks, such as the internet, other wide area networks, local area networks, metropolitan area networks, and so on.

In some implementations, the API permission management module 731 is configured to categorize (e.g., with a categorizing module 302) a plurality of APIs according to a plurality of API categories. The API categories are categorized by an API function through which user information is obtained (e.g., a function that is capable of obtaining user contact information, location information, call record information, etc.). The API permission management module 731 is further configured to set (e.g., with a setting module 721) a default invoking permission for a respective API category (e.g., to an access permission, a prohibition permission, or a prompt permission). The API permission management module 731 is configured to detect (e.g., with a monitoring/detecting module 303), in real time, an attempt by an application to invoke an API in the respective API category (e.g., an API call from an application, such as a Maps/Direction application). Upon detecting the attempted invocation of the API in the API category by the application, the API permission management module is configured control (e.g., with a controlling module 304) the invoking behavior of the API by the application in accordance with the default invoking permission for the API category (e.g., by allowing the API invocation if the permission is an access permission, or conversely prohibiting the API invocation if the permission is the prohibition permission).

To that end, the categorizing module 302 includes a set of instructions 302-a and heuristics and metadata 302-b. For example, metadata 302-b can include user defined information used to categorize APIs. Similarly, the setting module 721 includes a set of instructions 721-a as well as metadata and heuristics 721-b, monitoring/detecting module 303 includes a set of instructions 303-a and metadata and heuristics 303-b, and controlling module 304 includes a set of instructions 304-a and metadata and heuristics 304-b. In some implementations, the set of instructions 721-a of the setting module include instructions for providing a user interface (e.g., one or more of the user interfaces shown in FIGS. 5A-5D) for setting API permissions.

The above disclosures are merely preferred implementations of the present invention, but are not intended to limit the scope of the claims of the present invention. Any equivalent change made according to the claims of the present invention modification still falls within the scope of the present invention.

While particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A computer-implemented method of controlling invocation of an application programming interface (API), the method comprising:

at a computer having a processor and memory for storing one or more programs:
categorizing a plurality of APIs according to a plurality of API categories, wherein the API categories are categorized by an API function through which user information is obtained;
setting a default invoking permission for a respective API category;
detecting, in real time, an attempt by an application to invoke an API in the respective API category; and
upon detecting the attempted invocation of the API in the API category by the application, controlling the invoking behavior of the API by the application in accordance with the default invoking permission for the API category, wherein the default invoking permission for the API category may be altered by a user-selected current invoking permission.

2. The method of claim 1, wherein the invoking permissions comprise an access permission, a prohibition permission, and a prompt permission; and
the method further includes:
when the invoking permission of the respective API category is set to the access permission, allowing the application to invoke the API;

when the invoking permission of the respective API category is set to the prohibition permission, prohibiting the application from invoking the API; and when the invoking permission of the respective API category is set to the prompt permission, upon detecting the attempted invocation of the API:

prompting a user to set a current invoking permission to one of the access permission or the prohibition permission; and controlling the invoking behavior of the API by the application in accordance with the current invoking permission for the API category.

3. The method of claim 2, further comprising, after prompting the user to set the current invoking permission, if a response is not received from the user within a predetermined amount of time, automatically setting the current invoking permission to the prohibition permission.

4. The method of claim 2, further including, when the invoking permission of the API category is set to the prompt permission, prompting the user to declare whether the current invoking permission should replace the default invoking permission.

5. The method of claim 1, wherein setting the default invoking permission for the respective API category further comprises:

displaying a listing of one or more API categories that includes the respective API category;

detecting a user input corresponding to selection of the respective API category;

displaying a listing of one or more applications configured to invoke at least one API in the API category;

displaying a plurality of selectable affordances, each selectable affordance in the plurality of selectable affordances corresponding to an invoking permission;

detecting selection of a respective selectable affordance; and setting the default invoking permission to the invoking permission corresponding to the respective selectable affordance.

6. The method of claim 1, further comprising, prior to displaying the listing of the one or more API categories that includes the respective API category:

displaying a listing of a plurality of applications including a respective application capable of invoking at least one API in the respective API category; and detecting selection of the respective application;

wherein the listing of the one or more API categories is displayed upon detecting selection of the respective application, and each of the one or more API categories includes at least one API capable of being invoked by the respective application.

7. An electronic device, comprising:
one or more processors;
memory; and
one or more programs, wherein the one or more programs are stored in memory and configured to be executed by the one or more processors, the one or more programs including an operating system and instructions that when executed by the one or more processors cause the electronic device to:

categorize a plurality of APIs according to a plurality of API categories, wherein the API categories are categorized by an API function through which user information is obtained;

set a default invoking permission for a respective API category;

detect, in real time, an attempt by an application to invoke an API in the respective API category; and upon detecting the attempted invocation of the API in the API category by the application, control the invoking behavior of the API by the application in accordance with the default invoking permission for the API category, wherein the default invoking permission for the API category may be altered by a user-selected current invoking permission.

8. The electronic device of claim 7, wherein the invoking permissions comprise an access permission, a prohibition permission, and a prompt permission; and the instructions further cause the device to:

when the invoking permission of the respective API category is set to the access permission, allow the application to invoke the API;

when the invoking permission of the respective API category is set to the prohibition permission, prohibit the application from invoking the API; and when the invoking permission of the respective API category is set to the prompt permission, upon detecting the attempted invocation of the API:

prompt a user to set a current invoking permission to one of the access permission or the prohibition permission; and control the invoking behavior of the API by the application in accordance with the current invoking permission for the API category.

9. The electronic device of claim 8, the instruction further causing the device to, after prompting the user to set the current invoking permission, if a response is not received from the user within a predetermined amount of time, automatically set the current invoking permission to the prohibition permission.

10. The electronic device of claim 8, the instruction further causing the device to, when the invoking permission of the API category is set to the prompt permission, prompt the user to declare whether the current invoking permission should replace the default invoking permission.

11. The electronic device of claim 7, wherein setting the default invoking permission for the respective API category further comprises:

displaying a listing of one or more API categories that includes the respective API category;

detecting a user input corresponding to selection of the respective API category;

displaying a listing of one or more applications configured to invoke at least one API in the API category;

displaying a plurality of selectable affordances, each selectable affordance in the plurality of selectable affordances corresponding to an invoking permission;

detecting selection of a respective selectable affordance; and setting the default invoking permission to the invoking permission corresponding to the respective selectable affordance.

12. The electronic device of claim 7, the instruction further causing the device to, prior to displaying the listing of the one or more API categories that includes the respective API category:

display a listing of a plurality of applications including a respective application capable of invoking at least one API in the respective API category; and detect selection of the respective application;

wherein the listing of the one or more API categories is displayed upon detecting selection of the respective application, and each of the one or more API categories includes at least one API capable of being invoked by the respective application.

13. A non-transitory computer readable storage medium storing one or more programs, the one or more programs comprising an operating system and instructions, which when executed by an electronic device with one or more processors and memory, cause the electronic device to:
categorize a plurality of APIs according to a plurality of API categories, wherein the API categories are categorized by an API function through which user information is obtained;
set a default invoking permission for a respective API category;
detect, in real time, an attempt by an application to invoke an API in the respective API category; and
upon detecting the attempted invocation of the API in the API category by the application, control the invoking behavior of the API by the application in accordance with the default invoking permission for the API category, wherein the default invoking permission for the API category may be altered by a user-selected current invoking permission.

14. The non-transitory computer readable storage medium of claim 13, wherein the invoking permissions comprise an access permission, a prohibition permission, and a prompt permission; and
the instructions further cause the device to:
when the invoking permission of the respective API category is set to the access permission, allow the application to invoke the API;
when the invoking permission of the respective API category is set to the prohibition permission, prohibit the application from invoking the API; and
when the invoking permission of the respective API category is set to the prompt permission, upon detecting the attempted invocation of the API:
prompt a user to set a current invoking permission to one of the access permission or the prohibition permission; and
control the invoking behavior of the API by the application in accordance with the current invoking permission for the API category.

15. The non-transitory computer readable storage medium of claim 14, the instruction further causing the device to, after prompting the user to set the current invoking permission, if a response is not received from the user within a predetermined amount of time, automatically set the current invoking permission to the prohibition permission.

16. The non-transitory computer readable storage medium of claim 14, the instruction further causing the device to, when the invoking permission of the API category is set to the prompt permission, prompt the user to declare whether the current invoking permission should replace the default invoking permission.

17. The non-transitory computer readable storage medium of claim 13, wherein setting the default invoking permission for the respective API category further comprises:
displaying a listing of one or more API categories that includes the respective API category;
detecting a user input corresponding to selection of the respective API category;
displaying a listing of one or more applications configured to invoke at least one API in the API category;
displaying a plurality of selectable affordances, each selectable affordance in the plurality of selectable affordances corresponding to an invoking permission;
detecting selection of a respective selectable affordance; and
setting the default invoking permission to the invoking permission corresponding to the respective selectable affordance.

18. The non-transitory computer readable storage medium of claim 13, the instruction further causing the device to, prior to displaying the listing of the one or more API categories that includes the respective API category:
display a listing of a plurality of applications including a respective application capable of invoking at least one API in the respective API category; and
detect selection of the respective application;
wherein the listing of the one or more API categories is displayed upon detecting selection of the respective application, and each of the one or more API categories includes at least one API capable of being invoked by the respective application.

* * * * *